US011350055B2

United States Patent
Tsai

(10) Patent No.: US 11,350,055 B2
(45) Date of Patent: May 31, 2022

(54) PIXEL BINNING METHOD AND RELATED IMAGE READOUT CIRCUIT

(71) Applicant: NOVATEK Microelectronics Corp., Hsin-Chu (TW)

(72) Inventor: Jung-Yu Tsai, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 191 days.

(21) Appl. No.: 16/868,548

(22) Filed: May 7, 2020

(65) Prior Publication Data

US 2021/0352235 A1 Nov. 11, 2021

(51) Int. Cl.
*H04N 5/378* (2011.01)
*H04N 5/357* (2011.01)
*G06K 9/03* (2006.01)
*G06K 9/00* (2022.01)

(52) U.S. Cl.
CPC ........... *H04N 5/378* (2013.01); *G06K 9/0004* (2013.01); *G06K 9/03* (2013.01); *H04N 5/3577* (2013.01)

(58) Field of Classification Search
CPC .... H04N 5/378; H04N 5/3577; G06K 9/0004; G06K 9/03
See application file for complete search history.

(56) References Cited

U.S. PATENT DOCUMENTS

| 9,584,742 | B2* | 2/2017 | Park | H04N 5/347 |
| 9,686,485 | B2* | 6/2017 | Agranov | H04N 5/37457 |
| 10,334,189 | B1* | 6/2019 | Xu | H04N 5/378 |
| 2006/0187324 | A1* | 8/2006 | Lin | H04N 5/2327 348/241 |
| 2008/0260291 | A1* | 10/2008 | Alakarhu | H04N 9/04557 382/298 |
| 2012/0281121 | A1* | 11/2012 | Kim | H04N 5/351 348/241 |
| 2015/0062368 | A1* | 3/2015 | Li | H04N 5/2355 348/222.1 |

* cited by examiner

*Primary Examiner* — Nhan T Tran
(74) *Attorney, Agent, or Firm* — Winston Hsu

(57) ABSTRACT

A pixel binning method for processing pixel data acquired from an image sensor comprising a pixel array, the pixel binning method includes performing a first scanning process that is to scan a sensing area of the image sensor, to obtain a first number of pixel data; performing a second scanning process that is to scan the sensing area after the first scanning process is completed, to obtain a second number of pixel data; performing pixel binning on the second number of pixel data according to an offset value and an arithmetic value, wherein the offset value is determined according to the first number of pixel data.

14 Claims, 3 Drawing Sheets

PIXEL BINNING METHOD AND RELATED IMAGE READOUT CIRCUIT

BACKGROUND OF THE INVENTION

1. Field of the Invention

The present invention relates to a pixel binning method and an image readout circuit, and more particularly, to a pixel binning method and an image readout circuit capable of reducing quantization error of pixel binning.

2. Description of the Prior Art

Conventional image processing for pixel binning for an image sensor implemented in front-end analog circuits or rear-end digital processing units may combine multiple pixels into one pixel. A pixel binning method is to accumulate charges or sensing values of multiple pixels and then output an accumulated result to be as binning pixel data of the pixel after binning, which improves signal-to-noise ratio (SNR). However, an upper bound of data range of the pixel is easily to be exceeded and only a maximal pixel data with error are outputted. Another pixel binning method is to accumulate the charges or sensing values of multiple pixels and calculate an average result to be as binning pixel data of the pixel after binning, which maintains original values of the pixels. However, quantization error occurs due to rounding off or rounding up/down. Therefore, improvements are necessary to the conventional techniques.

SUMMARY OF THE INVENTION

Therefore, the present invention provides a pixel binning method and an image readout circuit to reduce quantization error of pixel binning.

An embodiment of the present invention discloses a pixel binning method for processing pixel data acquired from an image sensor comprising a pixel array, the pixel binning method comprises performing a first scanning process that is to scan a sensing area of the image sensor, to obtain a first number of pixel data; performing a second scanning process that is to scan the sensing area after the first scanning process is completed, to obtain a second number of pixel data; and performing pixel binning on the second number of pixel data according to an offset value and an arithmetic value, wherein the offset value is determined according to the first number of pixel data.

Another embodiment of the present invention discloses an image readout circuit for performing pixel binning on pixel data acquired from an image sensor comprising a pixel array, the image readout circuit comprises a scanning circuit, configured to perform a first scanning process that is to scan a sensing area of the image sensor to obtain a first number of pixel data and a second scanning process that is to scan the sensing area after the first scanning process is completed to obtain a second number of pixel data; and a pixel binning processing circuit, configured to perform pixel binning on the second number of pixel data according to an offset value and an arithmetic value, wherein the offset value is determined according to the first number of pixel data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
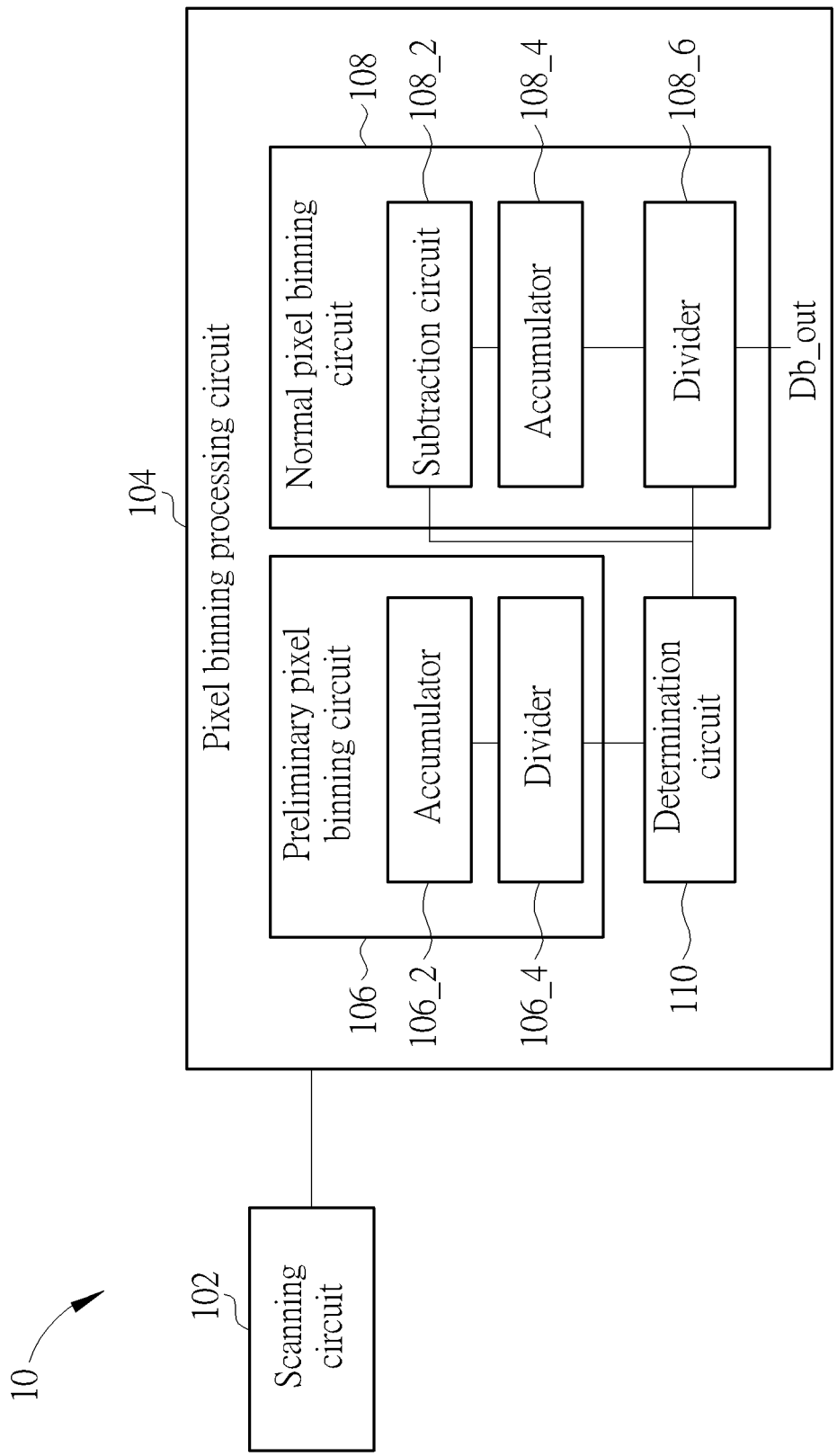
FIG. 1 is a schematic diagram of an image readout circuit according to an embodiment of the present invention.

Please refer to FIG. 1, which is a schematic diagram of an image readout circuit 10 according to an embodiment of the present invention. The image readout circuit 10 may be a readout circuit of an image sensor comprising a pixel array, for scanning the pixel array and performing pixel binning method on pixel data acquired from the image sensor, wherein the pixel data may be raw pixel data of an image. In an embodiment, the image sensor is adapted to sense biometric characteristic image such as fingerprint image. The image readout circuit 10 includes a scanning circuit 102 and a pixel binning processing circuit 104. The scanning circuit 102 is configured to perform a pre-scanning process to scan a sensing area of the image sensor to obtain a first number of pixel data and perform a normal scanning process to scan the sensing area after the pre-scanning process is completed to obtain a second number of pixel data. The pre-scanning process is performed for acquiring information of a data range that a currently sensed image may be within. That is, the image readout circuit 10 may use the first number of pixel data acquired by the pre-scanning process to generate required information which is used for a normal pixel binning process.

The pixel binning processing circuit 104 is configured to perform the normal pixel binning process on the second number of pixel data according to a bin size, an offset value and an arithmetic value, wherein the offset value and the arithmetic value are the said required information. The offset value is determined according to the first number of pixel data corresponding to the image. The first number of pixel data and the second number of pixel data are pixel data of a fingerprint image acquired at different times by the image sensor.

In detail, the pixel binning processing circuit 104 of the image readout circuit 10 of the present invention may further include a preliminary pixel binning circuit 106 and a normal pixel binning circuit 108 and a determination circuit 110 wherein the preliminary pixel binning circuit 106 includes an accumulator 106_2 and a divider 106_4 for processing a first raw pixel data, i.e. the aforementioned first number of pixel data, acquired by performing the pre-scanning process, and the normal pixel binning circuit 108 includes a subtraction circuit 108_2, an accumulator 108_4 and a divider 108_6 for processing a second raw pixel data, i.e. the aforementioned second number of pixel data, acquired by performing the normal scanning process. The preliminary pixel binning circuit 106 may be selectively configured to perform or not to perform pixel binning on the first number of pixel data. The determination circuit 110 is coupled to the divider 106_4, the subtraction circuit 108_2 and the divider 108_6.

In an embodiment, when the preliminary pixel binning circuit 106 is configured to not to perform pixel binning on the first number of pixel data, the first number of pixel data may bypass the accumulator 106_2 and the divider 106_4 and may be processed by the determination circuit 110. In such a condition, the determination circuit 110 may determine a maximal pixel data and a minimal pixel data from the first number of pixel data and determine a difference, denoted by d1, between the maximal pixel data and the minimal pixel data. The minimal pixel data of the first number of pixel data is used as an offset value, denoted by X1, applied in the normal pixel binning process. The determination circuit 110 may further determine the difference d1 between the maximal pixel data and the minimal pixel data and further generate an arithmetic value applied in the normal pixel binning process. The arithmetic value equals h/d1, wherein h is an ideal maximal pixel data based on a data resolution (i.e., the highest gray level that the data resolution can provide). The arithmetic value represents an enlarging ratio of the highest gray level that the data resolution can provide the detected data range where the first number of pixel data are within. The arithmetic value is used for reducing error due to overflow happening during the normal pixel binning process. For example, h may be 255 based on 8-bits pixel data, wherein 255 represents the highest gray level, and d1 may be the difference between the maximal pixel data such as 163 and the minimal pixel data such as 100 from the first number of pixel data. In such an example, the arithmetic value (h/d1) equals 255/(163−100) taking the round-off value. The output data of the normal pixel binning circuit 108 is denoted by Db_out and the normal pixel binning circuit 108 may have different ways to calculate the output data, which are distinguished by Db_out_1, Db_out_2, and so on. In this example, a formula (1) of output data Db_out_1 may be concluded accordingly:

$$Db\_out\_1 = \frac{\sum_{i=1}^{N-1}(Zi - X1)}{N/(h/d1)} \quad (1)$$

In formula (1), Zi represents each pixel data of the second number of pixel data acquired by performing the normal scanning process, and N is the bin size for performing the normal pixel binning process on the second number of pixel data. In another embodiment, the offset value may be 0 and a formula (2) of output data Db_out_2 output by the divider 108_6 may be concluded accordingly:

$$Db\_out\_2 = \frac{\sum_{i=1}^{N-1}(Zi)}{N/(h/d1)} \quad (2)$$

In the formula (1) or (2), N/(h/d1) is denoted as a second arithmetic value. In the normal pixel binning of the embodiment of the present invention, the accumulated data is divided by the second arithmetic value that is smaller than the bin size, therefore the quantization error may be reduced.

In another embodiment, when the preliminary pixel binning circuit 106 is configured to perform pixel binning on the first number of pixel data, the accumulator 106_2, the divider 106_4 and the determination circuit 110 are all enabled. In such a condition, the accumulator 106_2 may accumulate every k pixel data of the first number of pixel data corresponding to an m2*n2 matrix in the pixel array, so as to generate a plurality of accumulated data. k is the bin size for performing preliminary pixel binning on the first number of pixel data and equals m2*n2. For example, every four pixel data (i.e., k=2*2=4) among the 16 pixel data are accumulated to generate four accumulated data. Then, each accumulated data is divided by four by the divider 106_4 to generate one binning pixel data, so that four binning pixel data (i.e., the third number of binning pixel data) are generated. Then, the determination circuit 110 determines a minimal one of the four binning pixel data to be used as an offset value, denoted by X2, and determine a difference, denoted by d2, between a minimal binning pixel data and a maximal binning pixel data of the third number of binning pixel data. According to this embodiment, output data output by the divider 108_6 of the normal pixel binning circuit 108 may be calculated based on the formulas (1) or (2) where X1 and d1 are replaced with X2 and d2.

Figure 2:
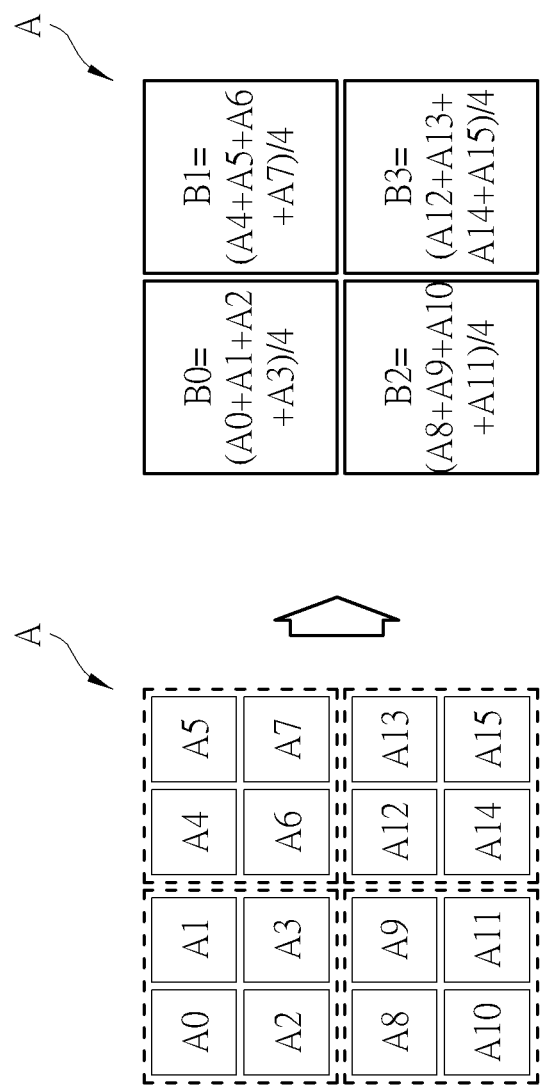
FIG. 2 is a schematic diagram of raw pixel data obtained by a pre-scanning process according to an embodiment of the present invention.

Preliminary pixel binning and the normal pixel binning are described in the following example. Assume that raw pixel data A0-A15 are obtained according to the pre-scanning process and raw pixel data AA0-AA15 are obtained according to the normal scanning process, as shown in FIG. 2, wherein the raw pixel data A0-A15 are acquired from a sensing area A of the image sensor which is scanned in the pre-scanning process, the raw pixel data AA0-AA15 are acquired from a sensing area AA of the image sensor which is scanned in the normal scanning process. The sensing area A may be same as or different (in size or in location) from the sensing area AA.

The preliminary pixel binning circuit 106 is configured to perform pixel binning on the raw pixel data A0-A15. In detail, the accumulator 106_2 accumulates every 4 pixel data corresponding to a 2*2 matrix in the pixel array of the image sensor, so as to generate four accumulated data. Herein, the bin size is 2*2 matrix. The divider 106_4 divides each accumulated data by four (that is the bin size) so that four binning pixel data B0-B3 are generated. For example, B0=(A0+A1+A2+A3)/4. The determination circuit 110 determines a minimal one of the four binning pixel data B0-B3 to be used as the offset value X2 and determines the difference d2 between a minimal binning pixel data and a maximal binning pixel data of the four binning pixel data B0-B3.

Figure 3:
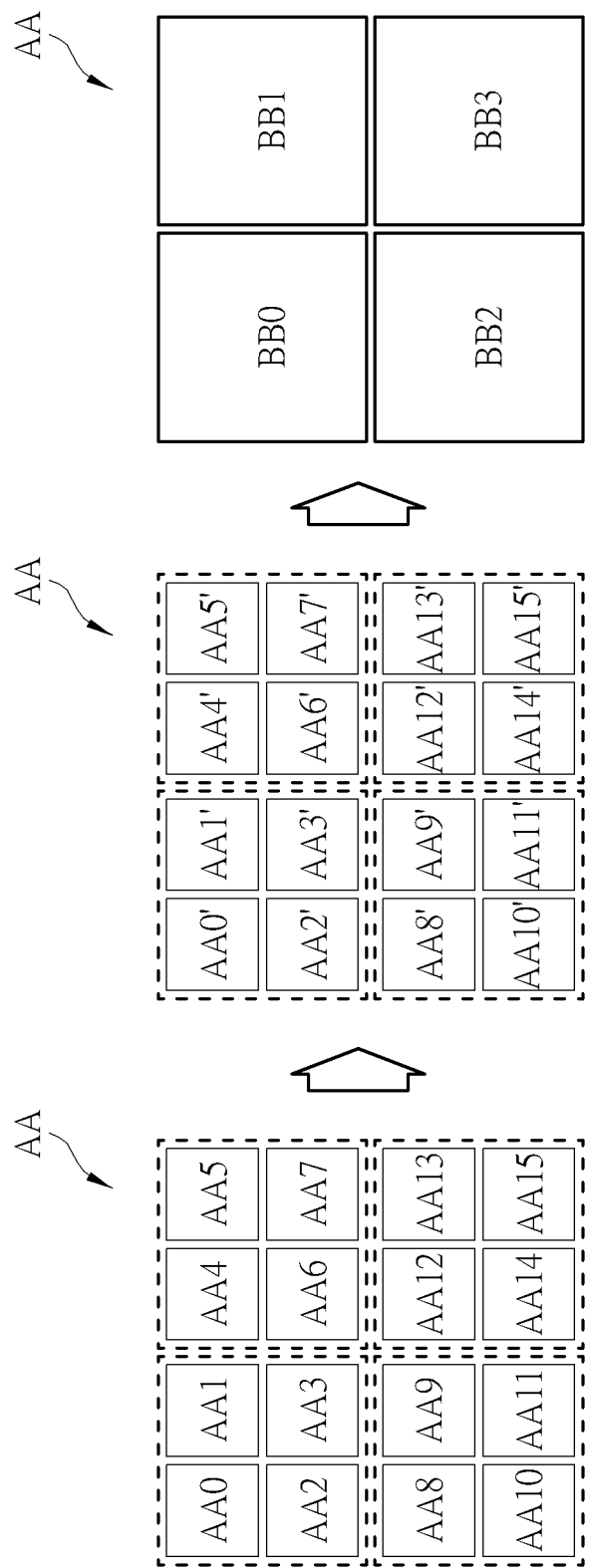
FIG. 3 is a schematic diagram of raw pixel data obtained by a normal scanning process according to an embodiment of the present invention.

Referring to FIG. 3, the normal pixel binning circuit 108 is configured to perform pixel binning on the raw pixel data AA0-AA15. In detail, the subtraction circuit 108_2 subtracts the offset value X2 from each of the raw pixel data AA0-AA15 to generate offset pixel data AA0' to AA15' to prevent overflow of the pixel data range. The accumulator 108_4 accumulates every q offset pixel data to generate an accumulated offset pixel data, and the q offset pixel data are corresponded to an m1*n1 matrix, which is a bin size for performing pixel binning on the second number of pixel data (wherein q is N in the formulas (1) an (2)). In the example of FIG. 3, the bin size is a 2*2 matrix and q equals 4, and every four offset pixel data are accumulated by the accumulator 108_4 to generate accumulated offset pixel data. Then, the divider 108_6 divides each accumulated offset pixel data by the second arithmetic value to generate a binning pixel data such as BB0, BB1, BB2 or BB3, which is the output data (Db_out) calculated according to the formula (1) or the formula (2). As the mentioned above, the second arithmetic value is smaller than the bin size, and the quantization error is reduced due to the dividing step of the divider 108_6.

Another example is given in the following. Assume that data resolution is 8-bits, the resolution of the image sensor has at least 640*480 pixels, the first number of pixel data acquired by the pre-scanning process is 640*480 pixel data. The bin size for the preliminary pixel binning process is 8*8 matrix. Therefore, the third number of binning pixel data are 80*60 pixel data. The minimal pixel data of the third number of binning pixel data is 100, the maximal pixel data of the third number of binning pixel data is 163, and the greatest gray level is 255. In other words, the binning pixel data are all in the gray level range from 100 to 163 without covering the gray level ranges 0-99 and 164-255. Hence, the offset value X2 is determined to be 100, and the arithmetic value (h/d2) is calculated to be 255/(163−100)=4, which may be a round-off value. Assume that the second number of pixel data acquired by the normal scanning process are 640*480 pixel data, and the bin size for the normal pixel binning process is 8*8 matrix. Therefore, there are 80*60 binning pixel data generated by the normal pixel binning process. Herein, the output data Db_out may be $\Sigma_{i=0}^{63}(Zi-100)/(64/4)$ based on the formula (1), wherein Zi represents each pixel data of the second number of pixel data.

In another embodiment, the second arithmetic value equals the bin size subtracted by a preconfigured shift value, which may be same as the arithmetic value (h/d) or a different value. In this example, a formula (3) of output data Db_out_3 may be concluded accordingly:

$$Db\_out\_3 = \frac{\sum_{i=1}^{N-1}(Zi - X)}{N - (h/d)} \quad (3)$$

In another embodiment, the offset value X may be 0, and a formula (4) of output data Db_out_4 may be concluded accordingly:

$$Db\_out\_4 = \frac{\sum_{i=1}^{N-1}(Zi)}{N - (h/d)} \quad (4)$$

wherein in the formulas (3) and (4), the offset value X and the difference d may be the aforementioned X1 and d1, for the case without preliminary pixel binning, or may be X2 and d2, for the case with preliminary pixel binning. N is the bin size. Notably, the bin size for the pre-scanning process may be different from the bin size of the normal scanning process.

Therefore, the pixel binning method and the image readout circuit of the present invention perform the pre-scanning process to obtain information for performing the normal pixel binning to reduce the quantization error. Moreover, those skilled in the art may properly implement the pixel binning method according to different requirements, which is not limited to above embodiments and is applicable to the present invention.

In summary, the present invention provides a pixel binning method and an image readout circuit thereof, which reduce quantization error of pixel binning and improve SNR of the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel binning method for processing pixel data acquired from an image sensor comprising a pixel array, the pixel binning method comprising:
   performing a first scanning process that is to scan a sensing area of the image sensor, to obtain a first number of pixel data;
   performing a second scanning process that is to scan the sensing area after the first scanning process is completed, to obtain a second number of pixel data; and
   performing pixel binning on the second number of pixel data according to an offset value, a bin size and an arithmetic value, wherein the offset value and the arithmetic value are determined according to the first number of pixel data.

2. The pixel binning method of claim 1, further comprising determining the offset value and the arithmetic value according to the first number of pixel data, wherein the offset value is a minimal pixel data of the first number of pixel data and the arithmetic value equals h divided by d1, wherein h is an ideal maximal pixel data based on a data resolution and d1 is a difference between a maximal pixel data of the first number of pixel data and the minimal pixel data of the first number of pixel data.

3. The pixel binning method of claim 1, wherein performing pixel binning on the second number of pixel data comprises:
   subtracting the offset value from each pixel data of the second number of pixel data to correspondingly generate the second number of offset pixel data;
   accumulating every q offset pixel data of the second number of offset pixel data to generate an accumulated data, wherein the every q offset pixel data are corresponded to an m1*n1 matrix in the pixel array and q is the bin size for performing pixel binning on the second number of pixel data; and
   dividing the accumulated data by a second arithmetic value to generate one binning pixel data of a third number of binning pixel data, wherein the second arithmetic value equals the bin size divided by the arithmetic value.

4. The pixel binning method of claim 1, wherein performing pixel binning on the second number of pixel data comprises:
   subtracting the offset value from each pixel data of the second number of pixel data to correspondingly generate the second number of offset pixel data;
   accumulating every q offset pixel data of the second number of offset pixel data to generate an accumulated data, wherein the every q offset pixel data are corresponded to an m1*n1 matrix in the pixel array and q is the bin size for performing pixel binning on the second number of pixel data; and
   dividing the accumulated data by a second arithmetic value to generate one binning pixel data of a third number of binning pixel data, wherein the second arithmetic value equals the bin size subtracted by a preconfigured shift value.

5. The pixel binning method of claim 1, further comprising:
   performing pixel binning on the first number of pixel data to generate a third number of binning pixel data; and
   determining the offset value and the arithmetic value according to the third number of binning pixel data, wherein the offset value is a minimal binning pixel data of the third number of binning pixel data and the arithmetic value equals h/d2, wherein h is an ideal maximal pixel data based on a data resolution and d2 is a difference between a maximal binning pixel data of the third number of binning pixel data and the minimal binning pixel data of the third number of binning pixel data.

6. The pixel binning method of claim 5, wherein performing pixel binning on the first number of pixel data comprises:
accumulating every k pixel data of the first number of pixel data to generate an accumulated data, wherein the every k pixel data are corresponded to an m2*n2 matrix in the pixel array and k is a bin size for performing pixel binning on the first number of pixel data; and
dividing the accumulated data by k to generate one binning pixel data of the third number of binning pixel data.

7. The pixel binning method of claim 1, wherein the first number of pixel data and the second number of pixel data are pixel data of a fingerprint image acquired from the image sensor.

8. An image readout circuit for performing pixel binning on pixel data acquired from an image sensor comprising a pixel array, the image readout circuit comprising:
a scanning circuit, configured to perform a first scanning process that is to scan a sensing area of the image sensor to obtain a first number of pixel data and a second scanning process that is to scan the sensing area after the first scanning process is completed to obtain a second number of pixel data; and
a pixel binning processing circuit, configured to perform pixel binning on the second number of pixel data according to an offset value, a bin size and an arithmetic value, wherein the offset value and the arithmetic value are determined according to the first number of pixel data.

9. The image readout circuit of claim 8, wherein the pixel binning processing circuit comprises a determination circuit configured to determine the offset value and the arithmetic value according to the first number of pixel data, wherein the offset value is a minimal pixel data of the first number of pixel data and the arithmetic value equals h divided by d1, wherein h is an ideal maximal pixel data based on a data resolution and d1 is a difference between a maximal pixel data of the first number of pixel data and the minimal pixel data of the first number of pixel data.

10. The image readout circuit of claim 8, wherein the pixel binning processing circuit comprises:
a subtraction circuit configured to subtract the offset value from each pixel data of the second number of pixel data to correspondingly generate the second number of offset pixel data;
an accumulator, configured to accumulate every q offset pixel data of the second number of offset pixel data to generate an accumulated data, wherein the every q offset pixel data are corresponded to an m1*n1 matrix in the pixel array and q is the bin size for performing pixel binning on the second number of pixel data; and
a divider, configured to divide the accumulated data by a second arithmetic value to generate one binning pixel data of a third number of binning pixel data, wherein the second arithmetic value equals the bin size divided by the arithmetic value.

11. The image readout circuit of claim 8, wherein the pixel binning processing circuit comprises:
a subtraction circuit, configured to subtract the offset value from each pixel data of the second number of pixel data corresponding to generate the second number of offset pixel data;
an accumulator, configured to accumulate every q offset pixel data of the second number of offset pixel data to generate an accumulated data, wherein the every q offset pixel data are corresponded to an m1*n1 matrix in the pixel array and q is the bin size for performing pixel binning on the second number of pixel data; and
a divider, configured to divide the accumulated data by a second arithmetic value to generate one binning pixel data of a third number of binning pixel data, wherein the second arithmetic value equals the bin size subtracted by a preconfigured shift value.

12. The image readout circuit of claim 8, wherein the pixel binning processing circuit is configured to perform pixel binning on the first number of pixel data to generate a third number of binning pixel data, and the pixel binning processing circuit comprises a determination circuit configured to determine the offset value and the arithmetic value according to the third number of binning pixel data, wherein the offset value is a minimal binning pixel data of the third number of binning pixel data and the arithmetic value equals h/d2, wherein h is an ideal maximal pixel data based on a data resolution and d2 is a difference between a maximal binning pixel data of the third number of binning pixel data and the minimal binning pixel data of the third number of binning pixel data.

13. The image readout circuit of claim 12, wherein the pixel binning processing circuit further comprises:
an accumulator, configured to accumulate every k pixel data of the first number of pixel data to generate an accumulated data, wherein the every k pixel data are corresponded to an m2*n2 matrix in the pixel array and k is a bin size for performing pixel binning on the first number of pixel data; and
a divider, coupled to the determination circuit and configured to divide the accumulated data by k to generate one binning pixel data of the third number of binning pixel data.

14. The image readout circuit of claim 8, wherein the first number of pixel data and the second number of pixel data are pixel data of a fingerprint image acquired from the image sensor.

* * * * *